US010435175B2

(12) United States Patent
Sure et al.

(10) Patent No.: US 10,435,175 B2
(45) Date of Patent: Oct. 8, 2019

(54) LIGHT EMITTING DIODE LAMP ASSEMBLY

(71) Applicant: HONEYWELL INTERNATIONAL INC., Morris Plains, NJ (US)

(72) Inventors: Anita Sure, Karnataka (IN); Raghuveer Hanumanthrao Desai, Karnataka (IN); Deepak Bhimrao Mahajan, Karnataka (IN); Vaibhav Baranwal, Karnataka (IN); Aniruddha A, Karnataka (IN); Sunit Kumar Saxena, Karnataka (IN); Anand Vivek Ravi, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 22 days.

(21) Appl. No.: 15/420,208

(22) Filed: Jan. 31, 2017

(65) Prior Publication Data

US 2018/0215481 A1    Aug. 2, 2018

(51) Int. Cl.
| F21V 23/06 | (2006.01) |
| F21K 9/235 | (2016.01) |
| B64D 47/06 | (2006.01) |
| F21K 9/68 | (2016.01) |
| F21V 29/70 | (2015.01) |
| F21K 9/23 | (2016.01) |
| F21Y 115/10 | (2016.01) |

(52) U.S. Cl.
CPC ............... *B64D 47/06* (2013.01); *F21K 9/23* (2016.08); *F21K 9/235* (2016.08); *F21K 9/68* (2016.08); *F21V 23/06* (2013.01); *F21V 29/70* (2015.01); *F21Y 2115/10* (2016.08)

(58) Field of Classification Search
CPC ......... B64D 47/06; F21V 29/70; F21V 23/06; F21K 9/68; F21K 9/235
See application file for complete search history.

(56) References Cited

U.S. PATENT DOCUMENTS

| 6,036,336 A | 3/2000 | Wu |
| 6,461,029 B2 | 10/2002 | Gronemeier et al. |
| 6,568,833 B2 | 5/2003 | Worgan et al. |
| 6,936,968 B2 | 8/2005 | Cross et al. |

(Continued)

OTHER PUBLICATIONS

Whelen Engineering Co., Whelen 2016 Aviation Lighting Catalog.
Machi, Nicolo, et al. "Honeywell Applies LEDs to Aircraft Position Lights," LEDs Magazine, Oct. 12, 2004.

*Primary Examiner* — Anabel Ton
(74) *Attorney, Agent, or Firm* — Lorenz & Kopf, LLP

(57) ABSTRACT

A light emitting diode (LED) lamp assembly includes a base including an electrical connector adapted to electrically engage a socket. A thermally conductive enclosure is coupled to the base, and a printed circuit board is disposed within the thermally conductive enclosure. The printed circuit board is operably electrically connected with the base and the electrical connector and thermally coupled to the enclosure. An LED is disposed on an exterior surface of the housing and electrically coupled to the printed circuit board. The thermally conductive enclosure is adapted to mechanically and thermally engage the socket to sink heat generated by the printed circuit board and the light source from the lamp assembly into the socket and an associated reflector.

16 Claims, 5 Drawing Sheets

(56) References Cited

U.S. PATENT DOCUMENTS

| | | |
|---|---|---|
| 7,434,970 B2 | 10/2008 | Machi et al. |
| 8,004,210 B2 | 8/2011 | Harmgardt et al. |
| 8,529,088 B2 | 9/2013 | Catalano et al. |
| 8,662,733 B2 | 3/2014 | Howard et al. |
| 8,668,361 B2 | 3/2014 | Hasnain et al. |
| 8,884,517 B1 * | 11/2014 | Shum ...................... F21V 29/15 315/32 |
| 9,157,580 B2 | 10/2015 | Bakk |
| 2011/0090690 A1 | 4/2011 | Scott et al. |
| 2013/0343055 A1 * | 12/2013 | Eckert ................... F21V 23/003 362/249.01 |
| 2014/0029285 A1 | 1/2014 | Bittinger et al. |
| 2015/0043212 A1 * | 2/2015 | Coffey ................... F21K 9/237 362/294 |
| 2016/0319996 A1 * | 11/2016 | Moon ....................... F21S 8/02 |
| 2016/0320004 A1 * | 11/2016 | Tudorica ................ F21V 29/76 |

\* cited by examiner

LIGHT EMITTING DIODE LAMP ASSEMBLY

TECHNICAL FIELD

This patent generally relates to aircraft position lights, and in particular, this patent relates to a light emitting diode (LED) lamp assembly that may be fitted as an aircraft position light as original or replacement equipment.

BACKGROUND

Aircraft are fitted with a variety of external lights such as landing lights, anti-collision strobes and beacons and position lights. Aircraft position lights (APLs), also known as navigation lights, by color and placement on the aircraft identify its position, heading and status. The location, color and intensity of the APLs is governed by national standards, e.g., as administered in the United States by the Federal Aviation Authority (FAA), and international standard, e.g., as administered by the International Standards Organization (ISO).

A commonly used APL is a halogen incandescent bulb fitted with a pg22 two post connector allowing it to be secured to a corresponding socket. The halogen APL is easily fitted and as necessary replaced, which because of its incandescent structure is frequently required. As an aircraft cannot operate without functioning APLs, burned out or otherwise inoperative incandescent APLs can lead to flight delays and, in commercial aviation, customer frustration and lost revenue.

Light emitting diodes (LEDs) offer superior operational life as compared to incandescent lamps, and in certain configurations superior light output. LED-based light assemblies, however, require driving circuitry, and depending on the light intensity output, heat dissipation structures, e.g., heat sinks.

Therefore, it is desirable to advantageously use LED-based light assemblies in aircraft lighting applications, such as APLs, owing to the anticipated reduction in aircraft downtime and associated maintenance costs. To permit use on existing aircraft, LED light assemblies should be direct one-for-one retro-fit incandescent light assemblies. This may be accomplished by a LED-based light assembly that is compact in size, including any heat dissipation structures, and uses standardized base structures so that the LED-based light assembly is one-for-one replaceable with existing incandescent bulbs. Other desirable features and characteristics of the herein described embodiments will become apparent from the subsequent detailed description and the appended claims, taken in conjunction with the accompanying drawings and the foregoing technical field and background.

SUMMARY

A light emitting diode (LED) lamp assembly includes a base including an electrical connector like PG22 2-post base with flange adapted to electrically engage a socket. A thermally conductive enclosure is coupled to the base, and a printed circuit board is disposed within the thermally conductive enclosure. The printed circuit board is operably electrically connected with the base and the electrical connector and is thermally coupled to the enclosure. An LED light source is mechanically coupled to an exterior surface of the thermally conductive enclosure and electrically coupled to the printed circuit board disposed within. The thermally conductive enclosure is adapted to mechanically and thermally engage the socket to sink heat generated by the printed circuit board and the LED light source into the socket and an associated reflector.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Embodiments of the subject matter described herein provide light emitting diode (LED) lamp assemblies that are a one-for-one replacement for incandescent bulbs, and in particular, may be adapted to be one-for-one replacements for aircraft position lights (APLs).

Figure 1:
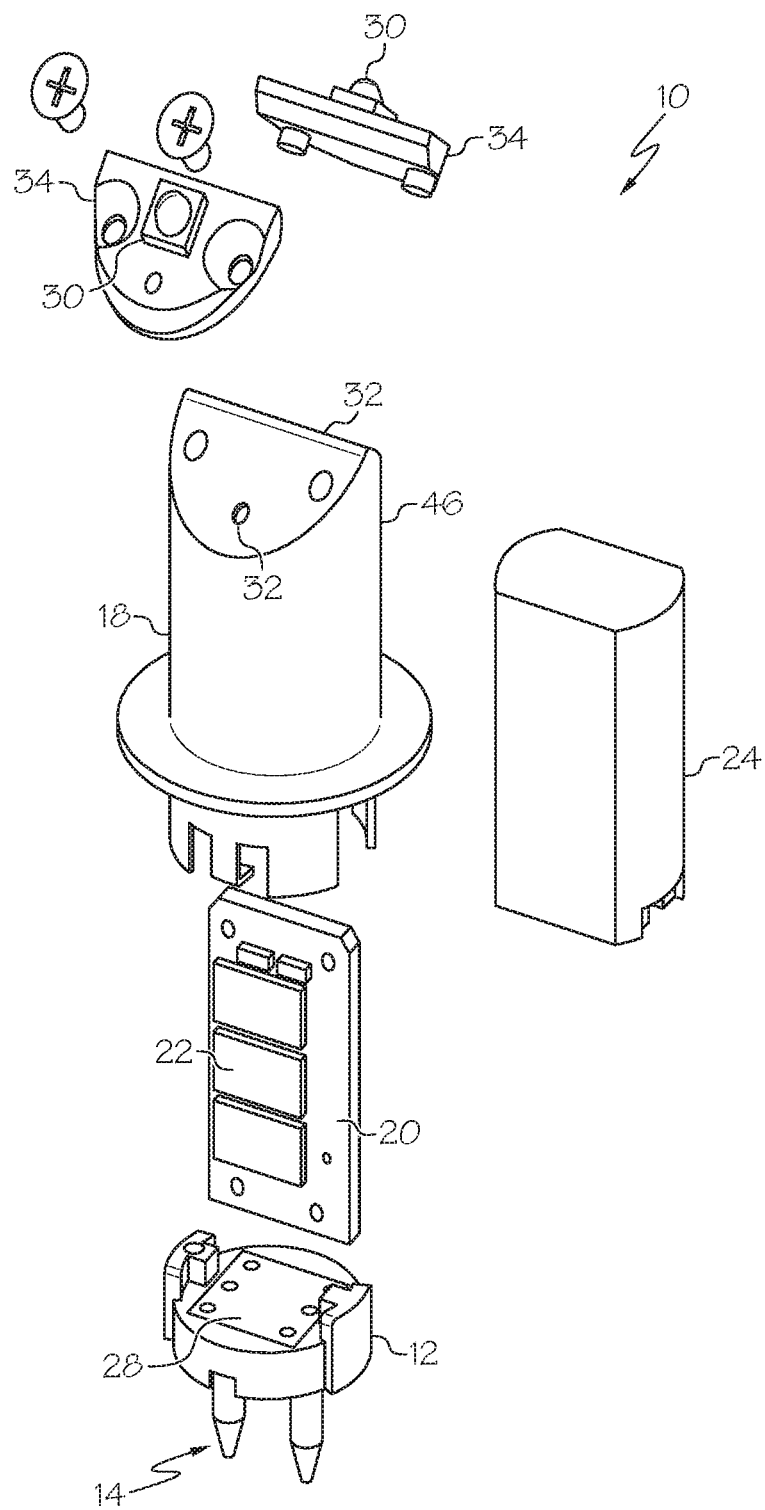
FIG. 1 is an expanded assembly graphic depiction of a light emitting diode (LED) lamp assembly in accordance with herein described embodiments.
Figure 2:
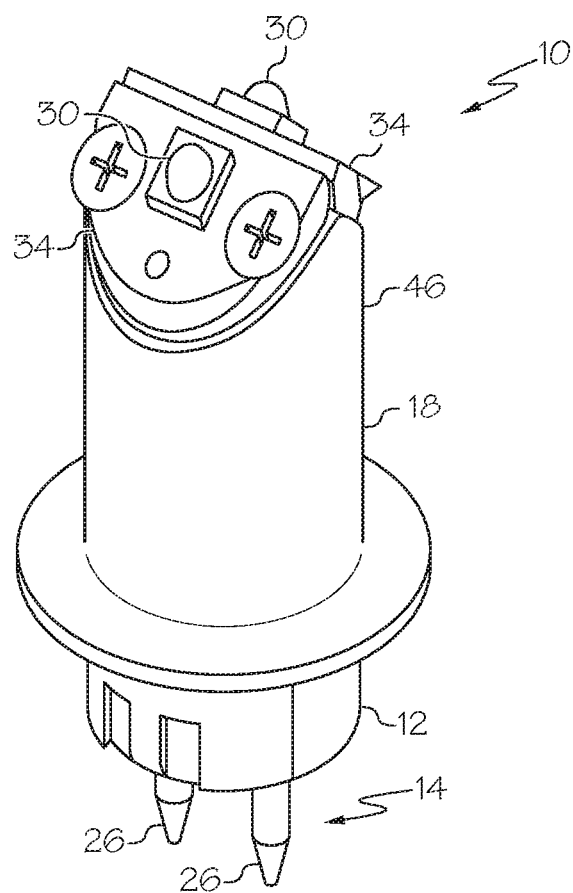
FIG. 2 is a graphic depiction of the LED lamp assembly of FIG. 1.
Figure 3:
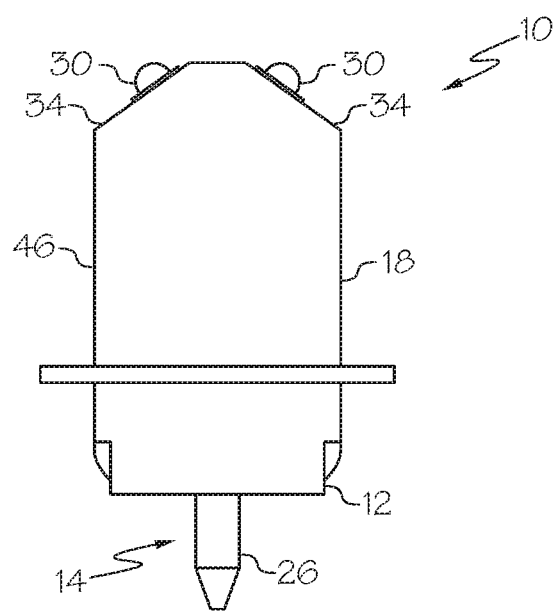
FIG. 3 is a graphic side view depiction of the LED lamp assembly of FIG. 1.
Figure 7:
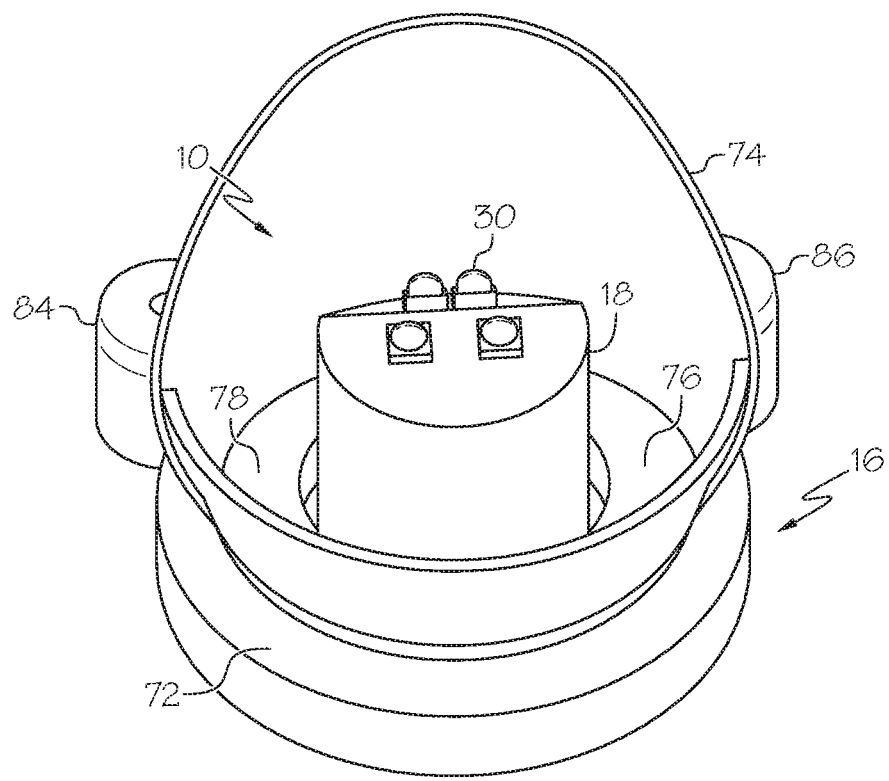
FIG. 7 is a graphic depiction of an LED lamp assembly engaged with a socket in accordance with the herein described embodiments.

Referring to FIGS. 1-3, an LED lamp assembly 10 includes a base 12 including a connector 14 adapted to electrically engage a socket (see, e.g., socket 16 in FIG. 7). The base 12 and connector 14 may be of a standard configuration or customized, while retaining critical standard requirements. In connection with the herein described exemplary embodiments, the base 12 and connector 14 conform to a pg22, two post standard. Of course, the base 12 and connector 14 can be any other configuration, such as without limitation, post, bayonet, flange, screw and the like-type configurations.

A thermally conductive enclosure 18 is coupled to the base 12. The thermally conductive enclosure 18 may be formed of a suitable low thermal resistance material such as aluminum, aluminum alloys, other metals and metal alloys, thermally conductive polymers and the like. A printed circuit board 20 is disposed within a cavity (not depicted) formed within the thermally conductive enclosure 18. The printed circuit board 20 is operably electrically connected with the base 12 and the connector 14 and is thermally coupled to the enclosure 18. To facilitate thermal transfer from the printed circuit board 20 to the thermally conductive housing 18, a thermal interface 22 may be formed on the printed circuit board 20, the thermal interface being in thermal communication, e.g., in contact with or closely proximate, an interior surface (not depicted) of the enclosure 18 to ensure a low thermal resistance path between the printed circuit board 20 and the enclosure 18. The thermal interface 22 may be a low thermal resistance material to facilitate communication of heat from circuit elements (not depicted) on the printed circuit board 20. Once disposed within the thermally conductive housing 18, the printed circuit board 20 may be secured therein with suitable potting or sealer material 24, as is well known in the art.

The base 12 may be plastic or metallic, and includes the posts 26, which are conductive, and that are electrically coupled to a contact base 28 providing electrical connectivity between the posts 26 and the printed circuit board 20. In alternate embodiments, the posts 26 may be directly electrically coupled to the printed circuit board 20 by wire bonding, pad bonding, bump bonding or any suitable connection structure. The printed circuit board 20 may be electrically coupled to the contact base 28 by wire bonding, pad bonding, bump bonding or any suitable connection structure. In alternative embodiments, the base 12 may have low thermal resistance and may act also to sink heat away from the LED lamp assembly 10 and into a socket into which the LED lamp assembly 10 is operably disposed. The posts 26 may be polarity insensitive in order to resemble a retrofit incandescent bulb.

At least one, and two are depicted, light emitting diodes (LEDs) 30 provide a source of light to be emitted from the LED lamp assembly 10. The LEDs 30 may be directly secured to a surface or surfaces 32 formed on the thermally conductive housing 18. Alternatively, and as depicted in FIGS. 1-3, LEDs 30 are secured to a substrate 34, and the substrate 34 is mechanically secured to the surfaces 32. The substrate 34 may be bonded, mechanical fastened, riveted or, as depicted in FIGS. 1 and 2, secured by threaded fasteners 36. The LEDs 30 may be coupled by electrical wire bonding, pad bonding, bump bonding or any suitable electrical connection, and the surfaces 32 may be formed with one or more passages or vias (not depicted) allowing for the electrical connection of the LEDs 30 to the printed circuit board 20.

Figure 4:
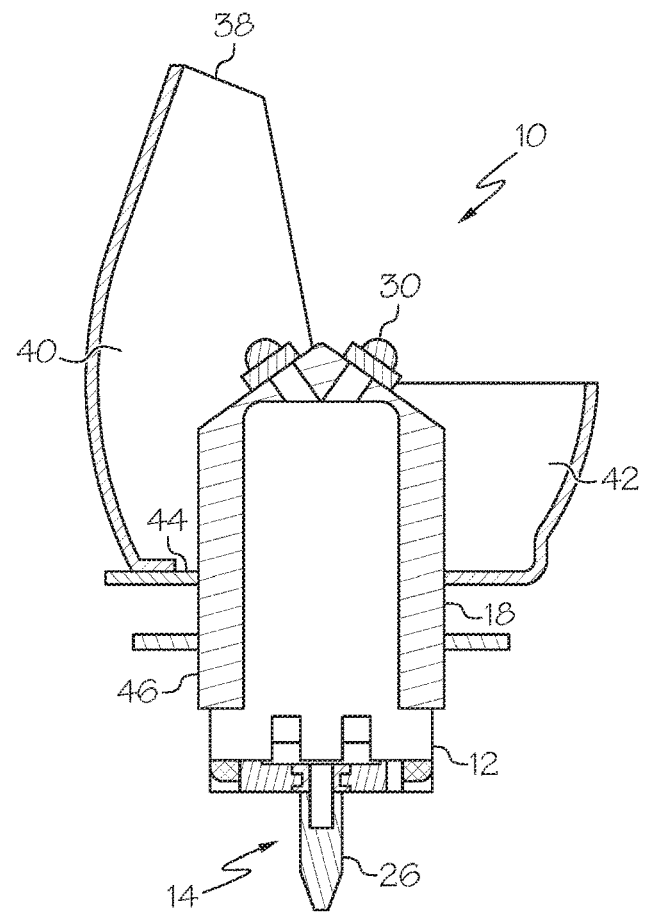
FIG. 4 is a graphic depiction of the LED lamp assembly of FIG. 1 and further illustrating a reflector assembly in accordance with the herein described embodiments.

Referring to FIG. 4, the LED lamp assembly 10 may optionally include a reflector assembly 38. In the exemplary embodiment depicted in FIG. 4, the reflector assembly 38 may have a tulip-like shape or any other shape as required with a first reflector element 40 and a second reflector element 42. The thermally conductive housing 18 extends through an aperture 44 formed in the reflector assembly 38. The reflector assembly 38 may be secured to the thermally conductive housing 18 by frictional engagement of the thermally conductive housing 12 and the aperture 44 by bonding, and the like. The first reflector element 40 and the second reflector element 42 are configured such that a light output of the LEDs 30 is reflected from the LED lamp assembly 10 in a pattern. The surfaces 32 form angles between zero degrees (0°) and ninety degrees (90°) relative to a side wall 46 of the thermally conductive housing 18. The orientation of the surfaces 32 on the LED lamp assembly 10, and hence the angular orientation of the LEDs 30, in combination with the structure of the reflector assembly 38 allows for the formation of virtually any pattern of directly emitted and reflected light of various colors to be created from the LED lamp assembly 10. For APL applications, the shape, color and intensity of the pattern may be governed by national and/or international standards, for example. In this regard the LEDs 30 may include LEDs of a color as per the location of the APL. In alternative embodiments described herein, the reflector assembly 38 may be part of a socket into which the LED lamp assembly 30 is secured when in use.

The reflector assembly 38 may be made of a thermally conductive material, such as aluminum, aluminum alloys, other metals and metal alloys, heat conducting polymers and the like. The reflector assembly 38 may be thermally coupled, in addition to being mechanically coupled, to the thermally conductive housing 18 by engagement of the aperture 44 with the side wall 46. In this respect, the reflector assembly 38 acts as an additional heat sink to the thermally conductive housing 18 to direct heat away from the printed circuit board 20 and the LEDs 30.

Figure 5:
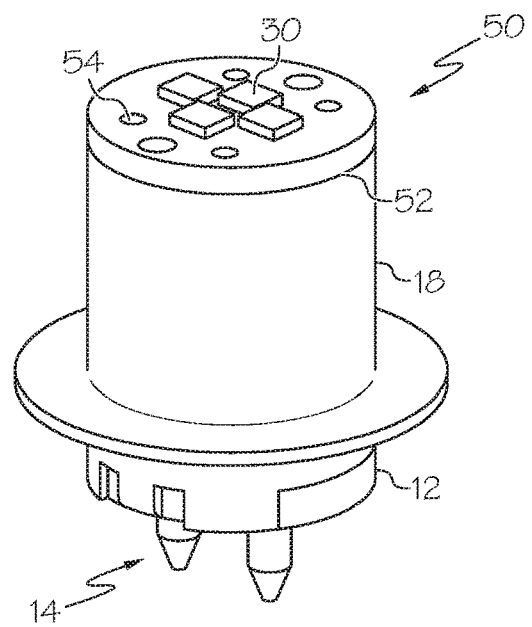
FIG. 5 is a graphic depiction of an LED lamp assembly in accordance with an alternative described embodiment.

With reference to FIG. 5 an alternative embodiment of an LED lamp assembly 50 is depicted, and like reference numerals are used to identify like elements. In place of the surfaces 32, the LED lamp assembly 50 has a surface 52. As depicted in FIG. 4, the surface 52 forms a right angle (i.e., oriented at 90°) to the side wall 46 of the thermally conductive housing 18. Alternatively, the surface 52 may be oriented at another angle not 90° relative to the side wall 46. A plurality of LEDs 30, four (4) depicted in FIG. 5, are disposed in a substrate 54, and the substrate 54 is disposed on the surface 52. Alternatively, LEDs 30 may be attached directly to the surface 52. The LEDs 30 are operably electrically connected to the printed circuit board 20 by wire bonding, pad bonding, bump bonding or by such other suitable electrical connection, through passages or vias (not depicted) formed in the substrate 54 and the surface 52.

Figure 6:
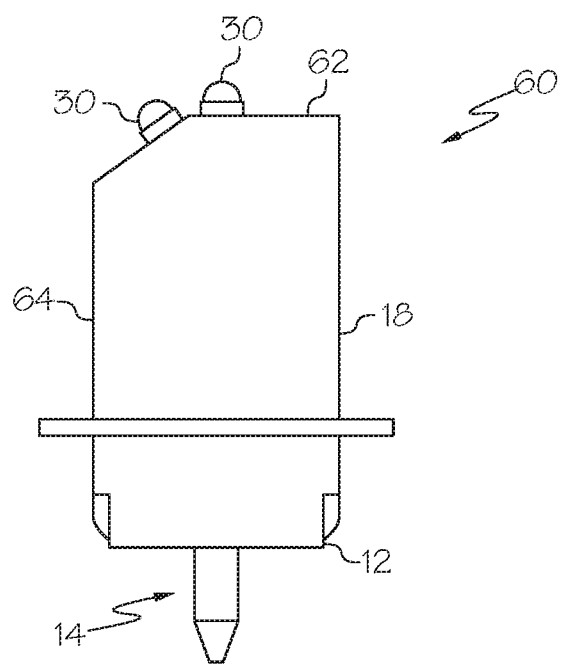
FIG. 6 is a graphic depiction of an LED lamp assembly in accordance with an alternative described embodiment.

With reference to FIG. 6 an alternative embodiment of an LED lamp assembly 60 is depicted, and like reference numerals are used to identify like elements to LED assemblies 10 and 50. In place of the surfaces 32, the LED lamp assembly 60 has a surface 62 and a surface 64. As depicted in FIG. 6, the surface 62 forms a right angle (i.e., oriented at 90°) to the side wall 46 of the thermally conductive housing 18, while the surface 64 is oriented at another angle not 90° relative to the side wall 46. A plurality of LEDs 30, two (2) depicted in FIG. 6, may be disposed in a first substrate and a second substrate (not depicted). Alternatively, LEDs 30 may be attached directly to the surfaces 62 and 64. The LEDs 30 are operably electrically connected to the printed circuit board 20 by wire bonding, pad bonding, bump bonding or by such other suitable electrical connection, through passages or vias (not depicted) formed in the first and second substrates and the surfaces 62 and 64.

With reference to FIG. 7, the socket 16 includes a base 72 adapted to receive an LED lamp assembly, such as LED lamp assemblies 10, 50 and 60, and for simplicity, reference in the following description is made only to LED lamp assembly 10. The socket 16 includes a reflector assembly 74, which like reflector assembly 38 may have a tulip-like shape or any other shape as required. The base 72 has a surface 76. The thermally conductive housing 18 may be formed with a flange 78 to provide thermal coupling between the thermally conductive housing 18 and the base 72. In this arrangement, the base 72 including the reflector assembly 74 cooperate with the thermally conductive housing 18 to enhance the heat sinking capacity of the thermally conductive housing 18. In this respect, the base 72 and the reflector assembly 74 may be made of thermally conductive materials such as aluminum, aluminum alloys, metals and metal alloys, thermally conductive polymers and the like. To enhance the thermal coupling between the thermally conductive housing 18 and the base 72, the base 72 may further be formed with a recess (not depicted) into which the flange 78 may be received to both mechanically couple and thermally couple the LED lamp assembly 10 into the socket 16. The base 72 may further include tabs 84 formed with apertures 86 allowing the socket 16 to be secured to a structure, such as the fuselage of an aircraft (not depicted).

Figure 8:
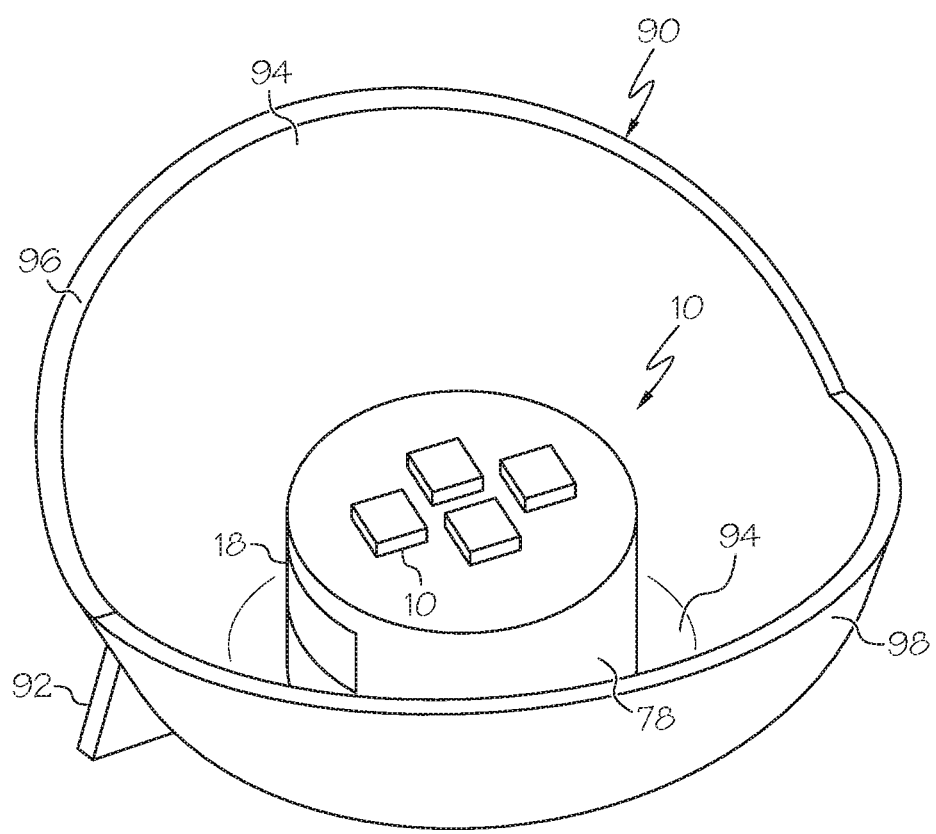
FIG. 8 is a graphic depiction of an LED lamp assembly engaged with a socket in accordance with the alternate herein described embodiments.

FIG. 8 depicts an LED lamp assembly 10 disposed within a socket 90, which is of similar construction as socket 16 and includes a base 92 and a reflector assembly 94. The reflector assembly 94 includes first reflector element 96 and second reflector element 98 configured to provide increased directionality to emitted and reflected light from the LEDs 30.

An LED lamp assembly, such as LED lamp assemblies 10, 50 and 60, includes a thermally conductive enclosure 18 that is adapted to mechanically and thermally engage a socket structure 16 to sink heat generated by the printed circuit board and the LED light source into the socket structure and an associated reflector. Such an LED lamp assembly may be configured to be a one-for-one replacement for incandescent aircraft position lights (APLs) and other applications.

The foregoing detailed description is merely exemplary in nature and is not intended to limit the application and uses. Furthermore, there is no intention to be bound by any expressed or implied theory presented in the preceding technical field, background, brief summary or the detailed description. It should be understood that throughout the drawings, corresponding reference numerals indicate like or corresponding parts and features. As used herein, the term system or module may refer to any combination or collection of mechanical systems and components and/or other suitable components that provide the described functionality.

Embodiments may be described herein in terms of functional and/or logical block components and various processing steps. It should be appreciated that such block components may be realized by any number, combination or collection of mechanical components configured to perform the specified functions. Those skilled in the art will appreciate that the herein described embodiments may be practiced in conjunction with any number of mechanical components and systems, and that the systems described herein are merely exemplary.

For the sake of brevity, conventional components and techniques and other functional aspects of the components and systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof. Accordingly, details of the exemplary embodiments or other limitations described above should not be read into the claims absent a clear intention to the contrary.

What is claimed is:

1. An LED lamp assembly for use in a socket structure including a reflector which directs the light emitted by the LED lamp assembly to a required zone to meet a position light requirement, the LED lamp assembly comprising: a base including an electrical connector, adapted to electrically engage the socket; a thermally conductive enclosure coupled to the base; a printed circuit board disposed within a cavity formed within the thermally conductive enclosure, the printed circuit board being operably and electrically connected with the base and the electrical connector and thermally coupled to the thermally conductive enclosure; and an electrically driven light source mechanically coupled to an exterior surface in a predefined orientation relative to a side wall of the thermally conductive enclosure and electrically coupled to the printed circuit board, and wherein the thermally conductive enclosure is adapted to mechanically and thermally engage the socket to sink heat generated by the printed circuit board and the light source into the socket structure and reflector and wherein the exterior surface comprising a first surface and a second surface, the first surface being oriented at a first angle and the second surface being oriented at a second angle, different than the first angle, and the LED comprising a first LED disposed in the first surface and a second LED disposed in the second surface, and wherein emitted and reflected light output of the first and second LEDs forms a pattern.

2. The LED lamp assembly of claim 1, the printed circuit board comprising a thermal interface in thermal communication with the thermally conductive housing.

3. The LED lamp assembly of claim 1, the LED comprising a plurality of LEDs.

4. The LED lamp assembly of claim 1 further comprising a reflector assembly mechanically and thermally joined to the thermally conductive housing.

5. The LED lamp assembly of claim 1, the thermally conductive housing further comprising a flange adapted to thermally engage the socket.

6. The LED lamp assembly of claim 1, the LED lamp assembly being polarity insensitive.

7. The LED lamp assembly of claim 1 disposed within an aircraft position light assembly such that the light emitted by the LED lamp assembly is directed to required zones to meet a position light requirement.

8. An LED lamp assembly for use in a socket structure including a reflector which directs the light emitted by the LED lamp assembly to a required zone to meet a position light requirement, the LED lamp assembly comprising: a base including an electrical connector, adapted to electrically engage the socket; a thermally conductive enclosure coupled to the base; a printed circuit board disposed within a cavity formed within the thermally conductive enclosure, the printed circuit board being operably and electrically connected with the base and the electrical connector and thermally coupled to the thermally conductive enclosure; and an electrically driven light source mechanically coupled to an exterior surface in a predefined orientation relative to a side wall of the thermally conductive enclosure and electrically coupled to the printed circuit board, and wherein the thermally conductive enclosure is adapted to mechanically and thermally engage the socket to sink heat generated by the printed circuit board and the light source into the socket structure and reflector, and wherein the LED lamp assembly is polarity insensitive.

9. The LED lamp assembly of claim 8, the exterior surface, when the LED lamp assembly is engaged with the socket, being oriented relative to the reflector such that an emitted and reflected light output of the LED forms a pattern.

10. The LED lamp assembly of claim 8, the exterior surface comprising a first surface and a second surface, the first surface being oriented at a first angle relative to a side wall of the thermally conductive housing and the second surface being oriented at a second angle relative to a side wall of the thermally conductive housing, different than the first surface, and the LED comprising a first LED disposed in the first surface and a second LED disposed in the second surface.

11. The LED lamp assembly of claim 8, the exterior surface comprising a first surface and a second surface, the first surface being oriented at a first angle and the second surface being oriented at a second angle, different than the first angle, and the LED comprising a first LED disposed in the first surface and a second LED disposed in the second surface, and wherein emitted and reflected light output of the first and second LEDs forms a pattern.

12. The LED lamp assembly of claim 8, the printed circuit board comprising a thermal interface in thermal communication with the thermally conductive housing.

13. The LED lamp assembly of claim 8, the LED comprising a plurality of LEDs.

14. The LED lamp assembly of claim 8, further comprising a reflector assembly mechanically and thermally joined to the thermally conductive housing.

15. The LED lamp assembly of claim 1, the thermally conductive housing further comprising a flange adapted to thermally engage the socket.

16. The LED lamp assembly of claim 8 disposed within an aircraft position light assembly such that the light emitted by the LED lamp assembly is directed to required zones to meet a position light requirement.

\* \* \* \* \*